United States Patent
Bordesoules et al.

(10) Patent No.: US 8,469,255 B2
(45) Date of Patent: Jun. 25, 2013

(54) METHOD FOR ASSEMBLING ALUMINUM ALLOY PARTS BY WELDING

(75) Inventors: Isabelle Bordesoules, Saint Egreve (FR); Armelle Danielou, Les Echelles (FR); Christine Henon, Claix (FR); Philippe Lequeu, Saint-Egreve (FR)

(73) Assignee: Constellium France, Paris (FR)

( * ) Notice: Subject to any disclaimer, the term of this patent is extended or adjusted under 35 U.S.C. 154(b) by 345 days.

(21) Appl. No.: 12/772,957

(22) Filed: May 3, 2010

(65) Prior Publication Data
US 2010/0288400 A1   Nov. 18, 2010

Related U.S. Application Data

(60) Provisional application No. 61/179,869, filed on May 20, 2009.

(30) Foreign Application Priority Data

May 13, 2009   (FR) ...................................... 09 02299

(51) Int. Cl.
*B23K 20/12*   (2006.01)

(52) U.S. Cl.
USPC ....... 228/112.1; 228/2.1; 228/233.2; 148/535

(58) Field of Classification Search
USPC ..................... 228/112.1, 2.1, 233.2; 148/437, 148/535
See application file for complete search history.

(56) References Cited

U.S. PATENT DOCUMENTS

| | | | |
|---|---|---|---|
| 4,610,733 A * | 9/1986 | Sanders et al. ................ | 148/695 |
| 6,168,067 B1 | 1/2001 | Waldron et al. | |
| 6,869,490 B2 * | 3/2005 | Cho .............................. | 148/698 |
| 7,360,676 B2 * | 4/2008 | Gheorghe ................... | 228/112.1 |
| 7,490,752 B2 * | 2/2009 | Ehrstrom et al. ........... | 228/112.1 |
| 7,614,539 B2 * | 11/2009 | Sankaran et al. ........... | 228/112.1 |
| 2005/0224562 A1 * | 10/2005 | Prevey ........................ | 228/233.1 |
| 2007/0138236 A1 | 6/2007 | Agarwal et al. | |
| 2007/0138239 A1 | 6/2007 | Kumagai et al. | |
| 2008/0047222 A1 | 2/2008 | Barnes | |
| 2009/0305077 A1 * | 12/2009 | Mizuguchi et al. ........... | 428/654 |

FOREIGN PATENT DOCUMENTS

| | | |
|---|---|---|
| EP | 0227563 A1 | 7/1987 |
| EP | 0 277 563 | 8/1988 |
| EP | 1 334 793 | 8/2003 |
| EP | 1 625 242 | 2/2006 |
| EP | 1 799 391 | 6/2007 |
| FR | 2 868 084 | 9/2005 |
| FR | 2868084 A1 | 9/2005 |
| WO | WO 03/082512 | 10/2003 |
| WO | WO 2004/014593 | 2/2004 |
| WO | WO 2008010266 | * 1/2008 |

OTHER PUBLICATIONS

International Search Report and Written Opinion dated Dec. 16, 2009 issued in corresponding Application No. PCT/FR2010/000343.

* cited by examiner

*Primary Examiner* — Roy King
*Assistant Examiner* — Michael Aboagye
(74) *Attorney, Agent, or Firm* — Baker, Donelson, Bearman, Caldwell & Berkowitz, PC

(57) ABSTRACT

The present disclosure concerns a method for assembling aluminum alloy parts, in which
(i) at least a first aluminum alloy part is procured in a solution heat treated, quenched, optionally cold worked, and naturally aged at ambient temperature or pre-aged temper, and at least a second aluminum alloy part,
(ii) said parts are welded to obtain a welded assembly having a welded zone,
(iii) cold working the entire welded zone between 0.3% and 5% is performed,
(iv) the welded assembly thus cold worked undergoes post-weld aging to obtain a final metallurgical temper.

15 Claims, 2 Drawing Sheets

METHOD FOR ASSEMBLING ALUMINUM ALLOY PARTS BY WELDING

CROSS-REFERENCE TO RELATED APPLICATIONS

This application claims priority to FR 0902299 filed May 13, 2009 and U.S. Provisional Application 61/179,869 filed May 20, 2009, the contents of which are incorporated herein by reference in their entireties.

BACKGROUND OF THE INVENTION

1. Field of the Invention

The present invention relates generally to the assembly by welding, particularly by friction stir welding (FSW), of aluminum alloy parts that can be hardened by heat treatment and particularly alloys hardened by a thermo-mechanical treatment comprising a solution heat-treatment, quenching, cold working and aging.

2. Description of Related Art

In the fabrication of metal structures, particularly metal structures intended for aeronautic construction, welding can replace more conventional assembly techniques such as riveting. Welding methods allow parts to be assembled rapidly without creating holes, the latter frequently being crack initiation sites. Welding methods are known in which a melting of the materials takes place, such that, notably, oxyacetylene welding with filler metal, arc welding with non-consumable electrodes (TIG), arc welding with consumable electrodes or semi-automatic welding (MIG), laser welding, plasma welding, and electron-beam welding. Solid phase welding methods are also known such as friction stir welding or friction welding. Unfortunately, a certain number of problems have limited the use of welding, notably in the field of aeronautic construction.

An initial problem generally encountered with welded parts is the decrease in the mechanical strength of the welded joint in relation to the metal away from the welded zone. An elastic limit level is typically obtained in the welded zone equal to approximately 60% of the elastic limit of the metal used.

A second problem generally encountered is the increase in corrosion sensitivity of the welded zone.

Yet another problem encountered is the microstructure of the welded zone, for example the abnormal enlargement of gains during the solution treatment after welding. Protection of the welded zone was proposed to solve the corrosion problem. Patent application US 2008/047222 (Lockheed Martin) details cold vapor deposition on the FSW welded joint of a material to inhibit corrosion. Patent application WO 2004/014593 (Eclipse Aviation) details the application of a layer of sealing material, such as a sealing/monomer adhesive material, on the surfaces to be assembled so as to form a polymer sealing joint in situ owing to the welding heat in order to protect the element from weld corrosion. However, with this type of protection method, the welded joint remains sensitive to corrosion and a coating defect is always possible, particularly for assemblies of complex shape.

Various pre-welding or post-welding heat treatment sequences were proposed to improve the final properties of the welded joint or the welded assembly. Patent EP 1625242 (Alcan Rhenalu) details a method in which the elements to be welded undergo heat treatment prior to welding, at a temperature T lasting at least 2t1, t1 being defined as the minimum duration of a treatment at temperature T leading to a specific energy of the fusion peak, defined by AED, of less than 1 J/g. Patent EP 1799391 (Alcan Rhenalu) details a method in which one of the elements of the welded assembly is pre-aged prior to welding so as to obtain a structural element comprising at least two aluminum alloy parts which have different property trade-offs. U.S. Pat. No. 6,168,067 (McDonnell Douglas) details a method wherein the weld is performed on parts which have undergone solution heat-treating and hardening and are in an incomplete metallurgical temper and an additional precipitation heat treatment is performed after welding. Patent EP 1334793 (Boeing) details a friction stir welding method in which the welding tool is heated before the weld joint is welded and a solution heat-treatment and quenching operation is performed on the welded assembly. Patent application US2007/0138239 (Sumitomo Light Metals) teaches a method of joining by friction stir welding wherein members are joined in T4 temper and wherein a reversion treatment is carried out prior to or after the joining step. It should be noted that the time period for reversion treatment is not longer than 300 s. Patent application FR 2 868 084 A1 (Pechiney Rhenalu) teaches a method comprising the steps of a) solution heat treating an intermediate product b) optionally stretching c) aging. A main aspect of the invention according to this application is to carry out aging in a furnace with a controlled temperature profile. This application teaches applying the claimed method to a welded assembly, which results in solution heat treating and aging of the welded assembly or on the members before welding. Furthermore, the introduction of compression stresses on the surface of the welded joint is known, by techniques such as burnishing and shot peening to improve its fatigue and corrosion resistance properties.

Patent applications WO 03/082512 or US2005/0224562 (Surface Technology) propose a method intended for the assembly of metals such as aluminum, titanium or steel, which uses a welding device having a welding tool and a compression tool enabling a superficial residual compressive stress layer to be induced, during the last step of the process, along the surface of the weld line and to apply a specified quantity of cold working and superficial quenching in all thermomarked regions. In this last document, the specific problem of adding a welding operation within the production process of aluminum alloys hardened by a thermo-mechanical treatment comprising the successive steps of solution heat-treatment, quenching, cold working and aging is not foreseen.

Thus, for certain aluminum alloys, notably the 2XXX series, the optimum properties are obtained after thermo-mechanical treatment of this type. The metallurgical temper obtained is a temper defined as T8 in standard EN 515. This designation applies to products that are solution heat-treated, cold-worked and artificially aged which, after solution heat-treatment, are cold worked to improve strength, or in which the effect of cold work in flattening or straightening is recognized in mechanical property limits. Among the alloys for which temper T8 is particularly favorable, several alloys of the 2XXX series are noted and particularly the aluminum copper lithium alloys.

Patent application EP 0 227 563 A1 (CEGEDUR) teaches a specific under-aging treatment resulting in desensitization to exfoliating corrosion for aluminum alloys containing lithium.

The assembly method of these products by welding poses specific problems as it must be established at which stage the welding step is to be performed in relation to the various steps of the solution heat-treatment, quenching, work hardening and aging process.

The welding operation can, for example, be performed on parts in temper T3 or temper T8, as described in U.S. Pat. No. 5,259,897 (Martin Marietta). While the results obtained are generally relatively satisfactory in terms of mechanical strength or corrosion resistance, it would be useful for certain applications to further improve the performance characteristics obtained for the welded joint, notably in terms of mechanical strength and corrosion resistance.

SUMMARY OF THE INVENTION

The present invention in some embodiments, inter alia aims to solve the problem of welding aluminum alloys, preferably with a final metallurgical temper of T8, in order to improve the properties of the welded joints, notably in terms of mechanical strength, corrosion resistance and microstructure of the welded zone.

A first object of the invention was to provide a method for assembling aluminum alloy parts, in which
(i) at least a first aluminum alloy part is procured in a solution heat treated, quenched, optionally cold worked, and naturally aged at ambient temperature or pre-aged temper, and at least a second aluminum alloy part,
(ii) said parts are welded to obtain a welded assembly having a welded zone,
(iii) cold working the entire welded zone between 0.3% and 5% is performed,
(iv) the cold worked welded assembly undergoes post-weld aging to obtain a final metallurgical temper.

Another object of the present invention was the provision of a welded assembly obtainable by a method comprising the steps of cold working the entire welded zone between 0.3% and 5% and post-weld aging the cold worked welded assembly to obtain a final metallurgical temper.

Another object of the present invention involves the use of a welded assembly according to the invention to produce various constructions such as a transport vehicle as well as aeronautic construction for fabrication of structural elements.

BRIEF DESCRIPTION OF THE DRAWINGS

The figures described below are exemplary of an embodiment of the present invention and are not intended to be limiting of the present invention.

DETAILED DESCRIPTION OF A PREFERRED EMBODIMENT

Figure 1:
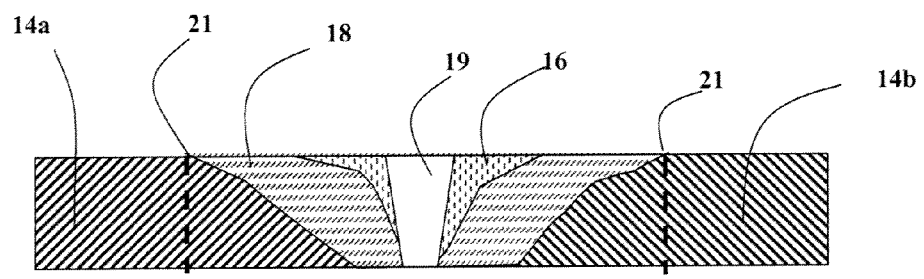
FIG. 1 shows the structure of the weld zone obtained by friction stir welding. (14*a*): first member, (14*b*): second member, (16): thermo-mechanically effected zone, (18): heat affected zone, (19): core, (21): limits of the welded zone.

The alloys are designated in compliance with the rules of The Aluminum Association (AA), known to the person skilled in the art. The definitions of metallurgical tempers are indicated in European standard EN 515. Unless otherwise mentioned, the static mechanical characteristics, in other words the tensile strength Rm, the 0.2% offset yield strength Rp0.2 and breaking elongation A, are determined by a tensile test as per standard EN 10002-1, the sampling and the direction of the test being defined by standard EN 485-1.

The present invention concerns inter alia, the manufacture of welded assemblies comprising at least one heat-treatable aluminum alloy part which, after solution heat-treatment, undergoes work hardening in order to relieve stress and/or improve its mechanical properties. The invention is particularly advantageous for welded assemblies comprising at least one heat-treatable aluminum alloy part which, after solution heat-treatment, is cold worked to improve strength, or in which the effect of cold work in flattening or straightening is recognized in mechanical property limits, i.e. the final metallurgical temper of which is known as T8 or T8X, the second digit after the 8 may be used to indicate the growing quantities of work hardening after solution heat-treatment or for certain particular tempers of T8 type, the second digit may be used to indicate different degrees of under-aging.

In a method according to the invention, at least a first aluminum alloy part is provided in a solution heat-treated, quenched, optionally cold worked temper, and naturally aged at ambient temperature or having undergone pre-aging, and at least a second aluminum alloy part. If the metallurgical temper of the first part is a temper naturally aged at ambient temperature, it is a metallurgical temper T3 (solution heat-treated, cold worked and naturally aged to a substantially stable condition) or T4 (solution heat-treated and naturally aged to a substantially stable condition). If the metallurgical temper of the first part is a pre-aged temper, this temper does not correspond to the final metallurgical temper but to a temper such as the final metallurgical temper obtained after post-weld aging is the result of the pre-aging and the post-weld aging.

At least one second aluminum alloy part is also provided. Advantageously, said second part is made of an alloy from the same group as said first part. Preferably, the second part is made of the same alloy and has the same metallurgical temper as the first part.

The provided parts are then positioned and welded. The parts may be any configuration or shape including flat or rectilinear such as sheets or structural sections or parts already having undergone a forming operation to form, for example, an aircraft fuselage. The parts can be of the same thickness or of different thickness. Assembling parts of different thickness can be advantageous as it limits the generation of aluminum scrap during final machining of the welded assembly. The parts may be shaped to assist the relative positioning, for example, with grooves, notches and additional formations. Parts can also be butt welded, filet welded or welded by any habitual welding method.

The welding methods in which fusion of the materials takes place, such as, notably, oxyacetylene welding with filler metal, arc welding with non-consumable electrodes (TIG), arc welding with consumable electrodes or semi-automatic welding (MIG), laser welding, plasma welding, and electron-beam welding can be used within the scope of the invention. However, solid phase welding methods are preferred in some cases. Friction stir welding is a preferred welding method, notably as the absence of filler rod enables thermo-mechanical treatments to be performed, which are optimized for alloys in both the welded zone and in the parent metal.

Following the welding operation, a welded zone is defined comprising the core of the weld and the weld's heat affected zone. The width of the welded zone can, for example, be determined by surface microhardness measurements of the welded joint. Within the scope of this invention, it is considered that the welded zone extends through the entire thickness of the assembled materials, even if in certain cases the zone thus defined includes a zone that is not heat affected, as illustrated by FIGS. 1 and 2.

Figure 2:
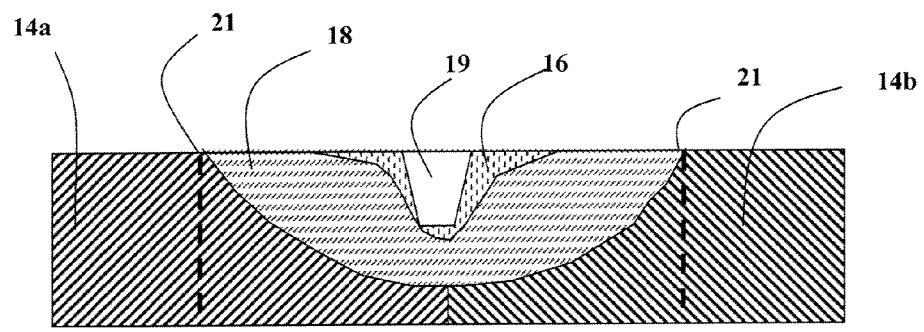
FIG. 2 shows the structure of the weld zone obtained by friction stir welding for thicker starting products.

FIG. 1 illustrates an example of metallurgical structure inside and around a zone welded by friction stir welding between two identical or different aluminum alloy parts (14a and 14b). Beside the zones located far from the weld which remains totally unaffected, 3 distinct zones can be distinguished, (19): the zone affected by the most severe plastic deformation is called the "nugget". The nugget is the stirred zone, plastically deformed and recrystallized with fine grains. The temperature there is the highest during the welding operation, between 470° C. and 580° C. It notably varies depending on the alloys, the thicknesses to be welded, and the welding parameters employed.

(16): the second zone on each side of the core is the thermo-mechanically affected zone (TMAZ). It is the border zone between the core and the heat affected zone, which was less deformed than the core, and which can show signs of recrystallization.

(18): the heat affected zone (HAZ) surrounds the previous plastically deformed zones and undergoes metallurgical transformations associated with the increased temperature (particularly, precipitation).

The weld zone considered within the scope of an embodiment of the present invention is typically bounded by the limits (21), determined on the surface, for example by micro-hardness measurement, and extending throughout the entire thickness of the parts. As such, in FIG. 2, the materials are thick in relation to the size of the core, although it is considered that the welded zone extends through the entire thickness of the materials.

According to the present invention, cold working between 0.3% and 5% of the entire welded zone is performed. Cold working may be performed for instance, in a direction parallel to the direction of the weld and/or in a perpendicular direction, by any method such as by compression and/or stretching and/or rolling.

In a first advantageous embodiment, cold working is performed by controlled stretching of the welded assembly. A welded assembly geometry allowing cold working to be performed by controlled stretching is a geometry in which, subjected to controlled tensioning, the entire welded assembly undergoes essentially equal deformation. The tensile stresses are preferably applied parallel to the weld. Thus, in this first embodiment, the cold working between 0.3% and 5% is performed not only on the welded zone but also on the other zones of the welded assembly. In this embodiment, it is advantageous that said first part is in metallurgical temper T4 or in slightly cold worked metallurgical temper T3 before welding; cold work less than 1% is preferred. Preferably, the cold working of the welded assembly performed by controlled stretching in this embodiment is between 2 and 4%.

In a second embodiment, this cold working operation between 0.3% and 5%, is performed locally typically by compression. Local cold working in this second embodiment consists essentially in deforming the welded zone. This second embodiment is normally performed when the geometry of the welded assembly does not allow deformation by controlled stretching to be performed in satisfactory conditions. This process may have the drawback of requiring numerous successive compression steps, but has the advantage of being able to be applied in the majority of cases.

In this second embodiment, it is advantageous that before welding said first part is in metallurgical temper T3, so that the parent metal has been cold worked prior to welding enabling the desired final metallurgical temper to be obtained. Advantageously, the cold work performed before welding in this second embodiment is between 2% and 5%. The inventors noted that surprisingly even a small deformation of the welded zone by compression allows significant improvement in the corrosion resistance of the welded joint. For the lowest deformation rates, less than 0.6%, the inventors observed that during the Mastmaasis test, the intergranular corrosion could be observed at depth in the core of the weld, in certain cases. Advantageously, the cold working carried out locally after welding in this second embodiment is thus between 0.6% and 2%.

The method according to the present invention is particularly advantageous when at least the first part is made of aluminum alloy of the 2XXX series, preferably if it is selected from the list consisting of AA2022, AA2094, AA2098, AA2198, AA2195, AA2196, AA2050, AA2039, AA2139, AA2124, AA2219 and AA2297.

Generally speaking, a method according to the present invention is advantageous when at least the first part is made of Al—Cu—Li aluminum alloy of the 2XXX series, preferably comprising 2% to 5% wt. % copper and 0.8% to 2.5% wt. % lithium. Advantageously, the Al—Cu—Li alloy used also contains 0.1% to 0.6% wt. % silver and 0.1% to 1% wt. % magnesium.

In a step following cold working the welded assembly, post-weld aging is performed to obtain a final metallurgical temper. The final metallurgical temper of said first part is preferably T8 or T8X although other metallurgical tempers are foreseeable, notably T7X51 tempers in the case of 7 alloys. The aging conditions are preferably from 120 to 200° C., preferentially from 140° C. to 200° C. for 10 to 60 hours. By aging conditions it is meant that at least one aging step of an aging treatment which may comprise several steps has said aging conditions. Within the scope of the first embodiment, a final metallurgical temper of T86 can be obtained for example by using deformation by 4% work hardening before welding, and deformation by controlled stretching of 2% after welding and appropriate aging.

The metallurgical microstructure of the welded zone of the assemblies obtained by a method according to the present invention is different from that of the products of according to the prior art. The inventors believe that cold working after welding followed by aging allows a microstructure to be generated in the welded zone, notably precipitation, favorable in terms of the mechanical properties and corrosion resistance. However, a quantified description of this microstructure is difficult and notably depends on the alloys used.

Advantageously, for an assembly welded according to the invention, the corrosion resistance according to the Mastmaasis test, performed according to standard ASTM G85 A2 is not below EA without the presence of intergranular corrosion, this result being observed on the surface and regardless of the depth of observation below the surface, notably at the core of the welded joint.

Advantageously, the efficiency coefficient of the joint, which is the ratio between the ultimate tensile strength of the welded joint in a direction perpendicular to the weld direction and that of the non-welded sheet or in a zone far from the welded zone, is at least 70% and preferably at least 85% for the welded assemblies according to the present invention. The welding assembly of the present invention may also be recognized as advantageously the Vickers microhardness in the weld zone, in the heat affected zone or in the thermo-mechanically affected zone is lower, but by a factor less than 20%, than the microhardness outside the weld zone when joined members are in an alloy selected from the list consisting AA/2022, AA2094, AA2098, AA2198, AA2195, AA2196, AA2050, AA2039, AA2124, AA2139, AA2219 and AA2297.

For example, for the friction stir welding of AA2050 alloy parts with a method according to the present invention, the microhardness of the welded zone, of the HAZ and of the TMAZ is lower by a factor less than 20%, compared with the microhardness outside the welded zone and the corrosion resistance of the core and the heat affected zone is as least EA according to the Mastmaasis test.

The welded assemblies according to the present invention are useful, for example, for the fabrication of transport vehicles, particularly for the fabrication of panels or structural sections. Particularly, the assemblies according to the invention are useful for the fabrication of railway cars, public transport vehicles, maritime transport, automobiles and aircraft. The welded assemblies according to the invention find particularly advantageous applications in aeronautic construction regarding the fabrication of structural elements. The term "structural element" refers to an element used in mechanical construction for which the static and/or dynamic mechanical characteristics are of particular importance for the performance and integrity of the structure, and for which a structural calculation is general prescribed or performed. It is typically a mechanical part, the failure of which is likely to endanger the safety of said construction, its users, its riders or others. For a plane, these structural elements include the parts which make up the fuselage (such as the fuselage skin, stringers, bulkheads, circumferential frames), the wings (such as the wing skin, stringers or stiffeners, ribs and spars) and the tail unit, made up of horizontal and vertical stabilizers, as well as floor beams, seat tracks and doors.

EXAMPLES

The following examples are exemplary and are no intended to be limiting to the present invention.

Example 1

In this example, 20 mm-thick AA2050 alloy T34 plates were used, i.e. stretched after quenching by approximately 4%. The plates, positioned edge to edge in long direction, were welded by friction stir welding to a depth of approximately 16 mm.

Certain welded assemblies were then stretched 2.5% in a direction parallel to the weld line.

The welded assemblies were then subjected to an aging treatment at 155° C. between 12 h and 24 h. For reference, an assembly stretched 2.5% did not undergo aging.

The welded assemblies thus obtained were characterized by tensile testing in the long direction (in a direction parallel to the weld line), by micro-hardness measurements, by corrosion tests under load (ASTM G44 and G49) long transverse direction, crossing the weld, and by exfoliation corrosion tests according to the Mastmaasis test (standard ASTM G85 A2, "dry bottom" conditions).

Figure 3:
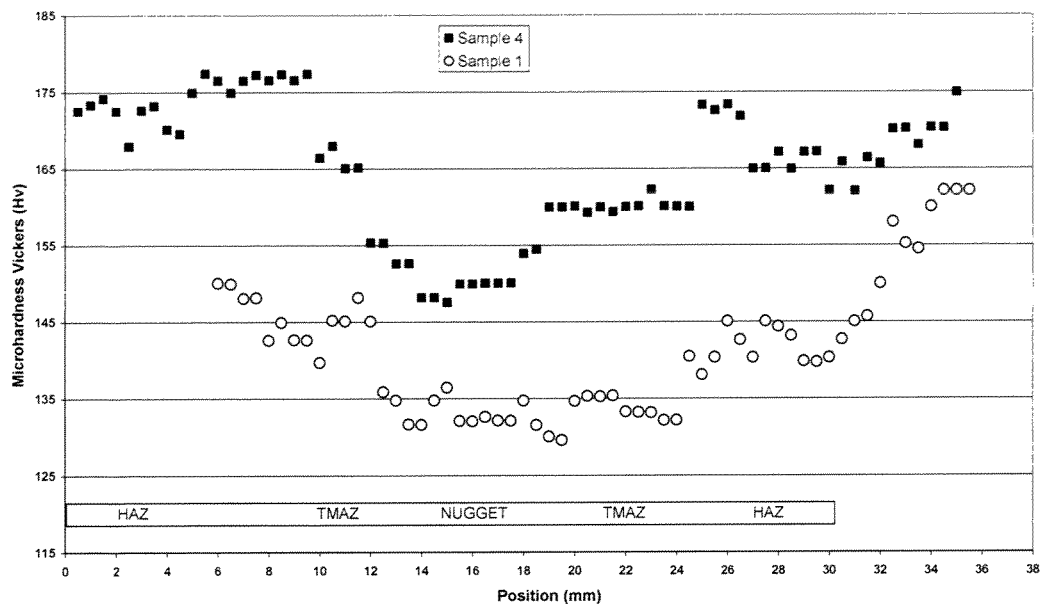
FIG. 3 shows microhardness in the weld zone for samples 1 and 4.

The results obtained for the mechanical tests are presented in Table 1. Samples 1 and 2 are reference examples, samples 3, 4 and 5 are examples according to the invention. Micro-hardness curves in the weld zone are compared for samples 1 and 4 on FIG. 3. Vickers micro-hardness in the weld zone is lower by a factor of about 15% compared to the non welded zone whereas it is lower by a factor of about 25% for the reference sample. Moreover samples according to the invention do not exhibit intergranular corrosion.

TABLE 1

Mechanical characteristics obtained on the various welded assembly samples.

| Sample | Post-weld traction | Aging | Sample centered on the weld bead (direction L) L0 = 40 mm | | | Sample in the parent metal (direction L) L0 = 40 mm | | |
|---|---|---|---|---|---|---|---|---|
| | | | Rm (MPa) | Rp0.2 (MPa) | A. (%) | Rm (MPa) | Rp0.2 (MPa) | A. (%) |
| 1 | 0% | 18 h 155° C. | 427 | 305 | 19 | 545 | 515 | 10 |
| 2 | 2.5% | — | 435 | 331 | 20 | 404 | 331 | 17 |
| 3 | 2.5% | 12 h 155° C. | 495 | 461 | 11 | 531 | 514 | 12 |
| 4 | 2.5% | 18 h 155° C. | 503 | 472 | 11 | 530 | 511 | 11 |
| 5 | 2.5% | 24 h 155° C. | 502 | 471 | 9 | 536 | 520 | 11 |

TABLE 2

Result of the stress corrosion tests

| Sample | Post-weld traction | Aging | Sample centred on the weld bead (direction TL) | | Sample in the parent metal (direction TL) | |
|---|---|---|---|---|---|---|
| | | | σ = 256 MPa | σ = 295 MPa | σ = 350 MPa | σ = 450 MPa |
| 1 | 0% | 18 h 155° C. | >40 d | >40 d | >40 d | >40 d |
| 2 | 2.5% | — | | Unavailable | | |
| 3 | 2.5% | 12 h 155° C. | >40 d | >40 d | >40 d | >40 d |

TABLE 2-continued

Result of the stress corrosion tests

| Sample | Post-weld traction | Aging | Sample centred on the weld bead (direction TL) | | Sample in the parent metal (direction TL) | |
|---|---|---|---|---|---|---|
| | | | $\sigma = $ 256 MPa | $\sigma = $ 295 MPa | $\sigma = $ 350 MPa | $\sigma = $ 450 MPa |
| 4 | 2.5% | 18 h 155° C. | >40 d | >40 d | >40 d | >40 d |
| 5 | 2.5% | 24 h 155° C. | >40 d | >40 d | >40 d | >40 d |

TABLE 3

Corrosion resistance observed after the Mastmaasis test.

| | Classification | | | Corrosion mode | | |
|---|---|---|---|---|---|---|
| Sample | Parent metal | Heat affected zone | Core | Parent metal | Heat affected zone | Core |
| 1 | N | EB/EC | N | Transgranular | Exfoliation, in certain cases, severe widespread corrosion | Intergranular and transgranular |
| 2 | EA | ED | N | Intergranular | Spalling | Intergranular |
| 3 | N/EA | N/EA | N | Transgranular | Transgranular | Transgranular |
| 4 | N/EA | N/EA | N | Transgranular | Transgranular | Transgranular |

Intergranular corrosion = corrosion located at the grain boundaries.
Transgranular corrosion = corrosion located inside grains.

Example 2

As in the previous example, 20 mm-thick AA2050 alloy T34 plates were used, i.e. stretched after quenching of approximately 4%. The plates, positioned edge to edge in the longitudinal direction, were welded by friction stir welding to a depth of approximately 16 mm (sample 6 and sample 7).

The weld zone, the width of which measured by microhardness measurement was from 50 to 70 mm. Samples taken from samples 6 and 7 where then compressed by a 80 mm wide tool in the weld zone.

The samplings, locally cold worked in the weld zone or not, then underwent aging heat treatment at 155° C. for 18 hours and were characterized by exfoliation corrosion tests according to the Mastmaasis test (per standard ASTM G85 A2, "dry bottom" conditions), after milling of 1 to 11 mm from the surface of the welded joint.

The results obtained are presented in Table 4

TABLE 4

Corrosion resistance observed after the Mastmaasis test.

| Sample | Welded zone compression rate | Depth of observation in relation to the surface of the joint (mm) | Classification | | | Corrosion mode | | |
|---|---|---|---|---|---|---|---|---|
| | | | Parent metal | Heat affected zone | Core | Parent metal | Heat affected zone | Core |
| 6 | 0% | 11 | P | EC | P | Transg | Exfoliation | Interg |
| 6 | 1.23% | 1 | P | P | P | Transg | Transg | Transg |
| 6 | 1.66% | 6.5 | P | P | P | Transg | Transg | Transg |
| 6 | 1.24% | 11 | P | EA | P | Transg | Transg | Transg |
| 7 | 0.60% | 1 | P | EA | P | Transg | Transg | Transg |
| 7 | 0.80% | 11 | P | EA | P | Transg | Transg | Transg |
| 7 | 0.83% | 1 | P | EA | P | Transg | Transg | Transg |
| 7 | 0.93% | 6.5 | P | EA | P | Transg | Transg | Transg |
| 7 | 0.88% | 11 | P | EA | P | Transg | Transg | Transg |
| 7 | 0.72% | 6.5 | P | P+ | P | Transg | Transg | Transg |

Transg: transgranular. Interg: Intergranular

Example 3

Seventy-five-millimeter plates made of AA2050 T34 alloy, i.e. stretched approximately 4% after quenching, were used. The plates, positioned edge to edge in the longitudinal direction, were welded by friction stir welding to a depth of approximately 16 mm (sample 8 and sample 9, this type of configuration is illustrated by FIG. 2).

The weld zone width measured by microhardness measurement was from 50 to 70 mm. Samples taken in samples 8 and 9 were then subjected to compression with an 80 mm wide tool in the weld zone.

The samples, locally cold worked in the weld zone or not, then underwent an aging treatment at 155° C. for 18 hours and were characterized by exfoliation corrosion tests according to the Mastmaasis test (per standard ASTM G85 A2, "dry bottom" conditions), after milling 0.2 mm to 10 mm from the surface of the welded joint.

The results obtained are presented in Table 5.

TABLE 5

Corrosion resistance observed after the Mastmaasis test.

| Sample | Welded zone compression rate | Depth of observation in relation to the surface of the joint (mm) | Classification Parent metal | Heat affected zone | Core | Corrosion mode Parent metal | Heat affected zone | Core |
| --- | --- | --- | --- | --- | --- | --- | --- | --- |
| 8 | 0% | 0.2 | P | EA | P | Transg | Transg | Transg + Interg |
| 8 | 0% | 10 | P | EA | P | Transg | Transg | Transg + Interg |
| 8 | 0% | 18 | P | EA | P | Transg | Transg | Transg + Interg |
| 8 | 1.25% | 0.2 | P | P | P | Transg | Transg | Transg |
| 8 | 0.71% | 0.2 | P | EA | P | Transg | Transg | Transg |
| 8 | 0.45% | 0.2 | P | EA | P | Transg | Transg | Transg |
| 8 | 0.47% | 10 | P | EA | P | Transg | Transg | Transg + Interg |
| 8 | 1.31% | 10 | P | EA | P | Transg | Transg | Transg |
| 9 | 0.69% | 10 | P | EA | P | Transg | Transg | Transg |

Transg: transgranular - Interg: intergranular

With the method according to the invention, no intergranular surface corrosion was observed (observation depth 0.2 mm) and intergranular corrosion was observed at depth (observation depth 10 mm) only in the case of the lowest compression rate of the weld zone (0.47%).

Example 4

In this example, 3 mm-thick AA2198 alloy T351 sheets were used. The sheets, positioned edge to edge in longitudinal direction, were welded by friction stir welding. For comparison, two sheets in a T851 temper, which were stretched 2% and aged 14 h at 155° C. before welding, were positioned edge to edge in long direction and welded by friction stir welding (sample 12).

Sample 11 was stretched 2% after welding whereas sample 10 was not stretched after welding. Welded assemblies were then aged 14 hours at 155° C.

The welded assemblies thus obtained were characterized by tensile testing in the LT direction (in a direction perpendicular to the weld line) and by micro-hardness measurements.

Figure 4:
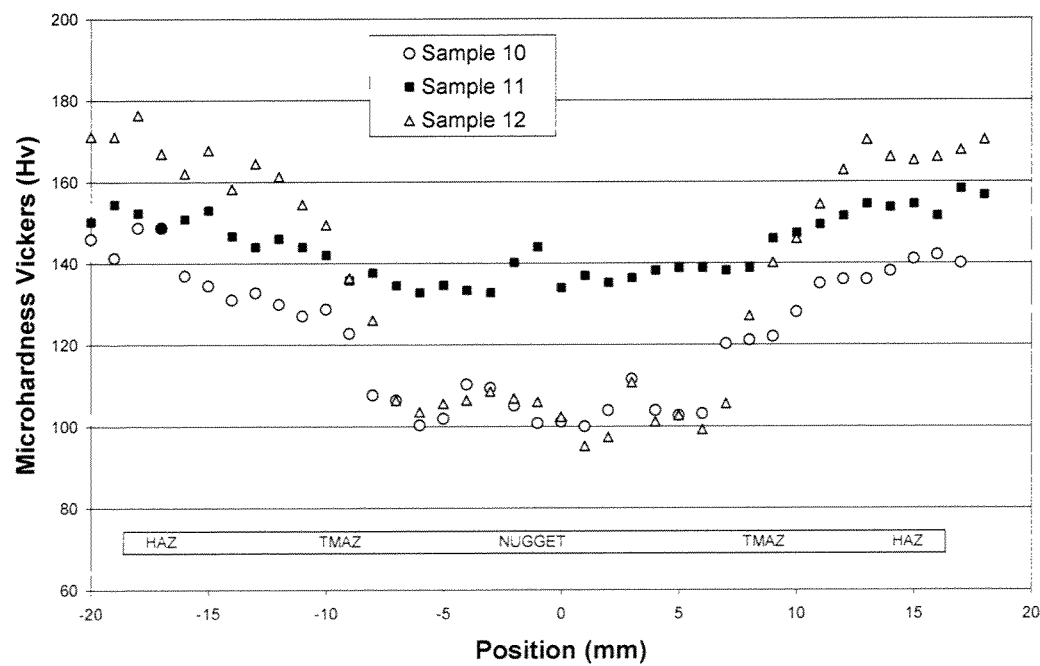
FIG. 4 shows microhardness in the weld zone for samples 10, 11 and 12.

The results obtained for the mechanical tests are presented in Table 6. Micro-hardness curves in the weld zone are compared for samples 10, 11 and 12 on FIG. 4. Vickers microhardness in the weld zone is lower by a factor of about 15% compared to the non welded zone whereas it is lower by a factor of about 30% to 40% for the reference samples.

TABLE 6

Mechanical characteristics obtained on the various welded assembly samples.

| | | | Sample perpendicular to the weld line (direction LT) L0 = 50 mm | | |
| --- | --- | --- | --- | --- | --- |
| Sample | Post-weld traction | Aging | Rm (MPa) | Rp0.2 (MPa) | A. (%) |
| 10 | 0% | 14 h 155° C. | 371 | 259 | 1.6 |
| 11 | 2% | 14 h 155° C. | 398 | 314 | 1.4 |
| 12 | 2% stretch and 14 h 155° C. before welding | | 495 | 369 | 262 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

In this specification and the claims that follow, singular forms such as "a," "an," and "the" include plural forms unless the content clearly dictates otherwise. All ranges disclosed herein include, unless specifically indicated, all endpoints and intermediate values. In addition, optional" or "optionally" refer, for example, to instances in which subsequently described circumstance may or may not occur, and include instances in which the circumstance occurs and instances in which the circumstance does not occur. Also, the terms "one or more" and "at least one" refer, for example, to instances in which one of the subsequently described circumstances occurs, and to instances in which more than one of the subsequently described circumstances occurs.

All documents referred to herein are incorporated by reference in their entireties to the extent explicitly referred to.

The invention claimed is:

1. A method for assembling aluminum alloy parts, comprising:
   (i) obtaining at least a first aluminum alloy part in a solution heat treated, quenched, optionally cold worked, and naturally aged at ambient temperature and/or pre-aged temper, and at least a second aluminum alloy part,
   (ii) welding said parts to obtain a welded assembly having a welded zone,
   (iii) cold working the entire welded zone from 0.3% to 5%,
   (iv) post-weld aging the cold worked welded assembly to obtain a final metallurgical temper wherein said post-weld aging is performed from 120° C. to 200° C. for 10 to 60 hours.

2. The method according to claim 1, wherein said cold working is performed by controlled stretching of the welded assembly.

3. The method according to claim 2, wherein said first aluminum alloy part is, before welding, in a T4 temper or in a T3 temper and with less than 1% cold work.

4. The method according to claim 2, wherein said cold working of the welded assembly performed by controlled stretching is from 2% to 4%.

5. The method according to claim 1, wherein said cold working is carried out locally by compression.

6. The method according to claim 5, wherein said first part aluminum alloy is, before welding, in a T3 temper, with cold work performed before welding, optionally from 2% to 5%.

7. The method according to claim 5, wherein said cold working performed locally is from 0.6% to 2%.

8. A method according to claim 1, wherein said first aluminum alloy part comprises an aluminum alloy of the 2XXX series.

9. The method according to claim 8, wherein said alloy of the 2XXX series is an Al—Cu—Li alloy.

10. The method according to claim 8, wherein said aluminum alloy of the 2XXX series is selected from the group consisting of AA2022, AA2094, AA2098, AA2198, AA2195, AA2196, AA2050, AA2039, AA2139, AA2124, AA2219 and AA2297.

11. A method according to claim 1, wherein said final metallurgical temper is T8 or T8X.

12. A process according to claim 1, wherein welding is performed by friction stir welding.

13. The method according to claim 9, wherein said alloy of the 2XXX series is an Al—Cu—Li alloy comprising 2 wt % to 5 wt % of copper, 0.8 wt % to 2.5 wt % of lithium, 0.1 wt % to 0.6 wt % of silver, and 0.1 wt % to 1 wt % of magnesium.

14. The method according to claim 1, wherein said post-weld aging is performed from 140° C. to 200° C. for 10 to 60 hours.

15. The method according to claim 1, wherein the welded assembly exhibits a corrosion resistance according to the Mastmaasis test, performed in accordance with standard ASTM G85 A2, of at least EA without the presence of intergranular corrosion.

* * * * *